United States Patent
Nadir et al.

(10) Patent No.: US 12,555,209 B2
(45) Date of Patent: Feb. 17, 2026

(54) LOCALLY-ADAPTIVE MULTI-SCALE IMAGE ENHANCEMENT

(71) Applicant: Samsung Electronics Co., Ltd., Suwon-si (KR)

(72) Inventors: Zeeshan Nadir, Allen, TX (US); Hamid Rahim Sheikh, Allen, TX (US); John William Glotzbach, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 121 days.

(21) Appl. No.: 18/426,063

(22) Filed: Jan. 29, 2024

(65) Prior Publication Data

US 2024/0404029 A1  Dec. 5, 2024

Related U.S. Application Data

(60) Provisional application No. 63/471,146, filed on Jun. 5, 2023.

(51) Int. Cl.
*G06T 5/92* (2024.01)
*G06T 3/40* (2024.01)
(Continued)

(52) U.S. Cl.
CPC .......... *G06T 5/92* (2024.01); *G06T 3/40* (2013.01); *G06T 5/40* (2013.01); *G06T 5/50* (2013.01);
(Continued)

(58) Field of Classification Search
CPC .... G06T 5/92; G06T 3/40; G06T 5/40; G06T 5/50; G06T 11/001; G06T 15/04;
(Continued)

(56) References Cited

U.S. PATENT DOCUMENTS 9,258,531 B2 * 2/2016 Jia .............................. H04N 5/21
9,741,099 B2 * 8/2017 Lim ........................... G06T 5/50
(Continued)

FOREIGN PATENT DOCUMENTS

CN     106296600 A    1/2017
CN     109325922 B    3/2022
(Continued)

OTHER PUBLICATIONS

Wikipedia, "Adaptive histogram equalization," Oct. 2022, 4 pages.
(Continued)

*Primary Examiner* — Vijay Shankar

(57) ABSTRACT

A method includes downsampling an input frame and performing global contrast enhancement of the input frame based on the downsampled input frame to generate a globally contrast-enhanced frame. The method also includes generating texture maps at different scale resolutions based on the downsampled input frame. The method further includes generating clipped histograms at the different scale resolutions based on the downsampled input frame. The method also includes generating lookup tables (LUTs) at the different scale resolutions based on the texture maps and the clipped histograms. The method further includes applying the LUTs at the different scale resolutions to the input frame in order to generate locally contrast-enhanced frames. In addition, the method includes blending the locally contrast-enhanced frames and the globally contrast-enhanced frame to generate an output frame.

20 Claims, 15 Drawing Sheets

(51) Int. Cl.
  *G06T 5/40* (2006.01)
  *G06T 5/50* (2006.01)
  *G06T 11/00* (2006.01)
  *G06V 10/54* (2022.01)

(52) U.S. Cl.
  CPC ............ *G06T 11/001* (2013.01); *G06V 10/54* (2022.01); *G06T 2207/20072* (2013.01); *G06T 2207/20221* (2013.01)

(58) Field of Classification Search
  CPC ......... G06T 15/10; G06T 15/30; G06T 17/05; G06T 2207/20072; G06T 2207/20221; G06T 2207/10016; G06T 2207/10024; G06T 2207/20021; G06V 10/54
  See application file for complete search history.

(56) References Cited

U.S. PATENT DOCUMENTS

| | | | |
|---|---|---|---|
| 9,773,300 B2* | 9/2017 | Min | G06T 5/10 |
| 9,922,616 B2 | 3/2018 | Yang et al. | |
| 12,159,383 B2* | 12/2024 | Meshkin | G06N 3/04 |
| 2012/0236184 A1 | 9/2012 | Jia et al. | |
| 2013/0022287 A1 | 1/2013 | Hooper | |
| 2015/0296193 A1* | 10/2015 | Cote | G06T 3/4015 |
| | | | 382/167 |
| 2016/0035069 A1 | 2/2016 | Min et al. | |
| 2017/0169548 A1 | 6/2017 | Wen | |
| 2020/0219238 A1 | 7/2020 | Peng et al. | |
| 2021/0304365 A1 | 9/2021 | Bhattacharjee et al. | |
| 2022/0058781 A1 | 2/2022 | Gal | |
| 2022/0392029 A1 | 12/2022 | Soons et al. | |
| 2023/0146181 A1* | 5/2023 | Meshkin | G06T 5/90 |
| | | | 382/274 |
| 2023/0351608 A1 | 11/2023 | Rivard et al. | |

FOREIGN PATENT DOCUMENTS

| | | |
|---|---|---|
| CN | 114821021 A | 7/2022 |
| CN | 115880172 A | 3/2023 |
| KR | 10-2015-0097367 A | 8/2015 |
| KR | 10-2019-0080737 A | 7/2019 |

OTHER PUBLICATIONS

International Search Report and Written Opinion of the International Searching Authority dated Jul. 22, 2024 in connection with International Patent Application No. PCT/KR2024/005385, 8 pages.

Supplementary European Search Report dated Dec. 11, 2025 in connection with European Patent Application No. 24819475.5, 10 pages.

Ma et al., "Image Dehazing Based on Improved Color Channel Transfer and Multiexposure Fusion," Research Article, Hindawi, Advances in Multimedia, vol. 2023, Article ID 8891239, May 2023, 10 pages.

* cited by examiner

LOCALLY-ADAPTIVE MULTI-SCALE IMAGE ENHANCEMENT

CROSS-REFERENCE TO RELATED APPLICATION AND PRIORITY CLAIM

This application claims priority under 35 U.S.C. § 119(e) to U.S. Provisional Patent Application No. 63/471,146 filed on Jun. 5, 2023, which is hereby incorporated by reference in its entirety.

TECHNICAL FIELD

This disclosure relates generally to image processing. More specifically, this disclosure relates to locally-adaptive multi-scale image enhancement.

BACKGROUND

Many mobile electronic devices, such as smartphones and tablet computers, include cameras that can be used to capture still and video images. While effective, images captured using these devices may suffer from various shortcomings. For example, images captured using these devices may have relatively low image contrast. Moreover, due to limited knowledge of image processing pipelines, users generally do not want to take steps to manually enhance the image contrast of captured images.

SUMMARY

This disclosure relates to locally-adaptive multi-scale image enhancement.

In a first embodiment, a method includes downsampling an input frame and performing global contrast enhancement of the input frame based on the downsampled input frame to generate a globally contrast-enhanced frame. The method also includes generating texture maps at different scale resolutions based on the downsampled input frame. The method further includes generating clipped histograms at the different scale resolutions based on the downsampled input frame. The method also includes generating lookup tables (LUTs) at the different scale resolutions based on the texture maps and the clipped histograms. The method further includes applying the LUTs at the different scale resolutions to the input frame in order to generate locally contrast-enhanced frames. In addition, the method includes blending the locally contrast-enhanced frames and the globally contrast-enhanced frame to generate an output frame.

In a second embodiment, an electronic device includes at least one processing device configured to downsample an input frame and perform global contrast enhancement of the input frame based on the downsampled input frame to generate a globally contrast-enhanced frame. The at least one processing device is also configured to generate texture maps at different scale resolutions based on the downsampled input frame. The at least one processing device is further configured to generate clipped histograms at the different scale resolutions based on the downsampled input frame. The at least one processing device is also configured to generate LUTs at the different scale resolutions based on the texture maps and the clipped histograms. The at least one processing device is further configured to apply the LUTs at the different scale resolutions to the input frame in order to generate locally contrast-enhanced frames. In addition, the at least one processing device is configured to blend the locally contrast-enhanced frames and the globally contrast-enhanced frame to generate an output frame.

In a third embodiment, a non-transitory machine readable medium contains instructions that when executed cause at least one processor to downsample an input frame and perform global contrast enhancement of the input frame based on the downsampled input frame to generate a globally contrast-enhanced frame. The non-transitory machine readable medium also contains instructions that when executed cause the at least one processor to generate texture maps at different scale resolutions based on the downsampled input frame. The non-transitory machine readable medium further contains instructions that when executed cause the at least one processor to generate clipped histograms at the different scale resolutions based on the downsampled input frame. The non-transitory machine readable medium also contains instructions that when executed cause the at least one processor to generate LUTs at the different scale resolutions based on the texture maps and the clipped histograms. The non-transitory machine readable medium further contains instructions that when executed cause the at least one processor to apply the LUTs at the different scale resolutions to the input frame in order to generate locally contrast-enhanced frames. In addition, the non-transitory machine readable medium contains instructions that when executed cause the at least one processor to blend the locally contrast-enhanced frames and the globally contrast-enhanced frame to generate an output frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings.

DETAILED DESCRIPTION

Figure 1:
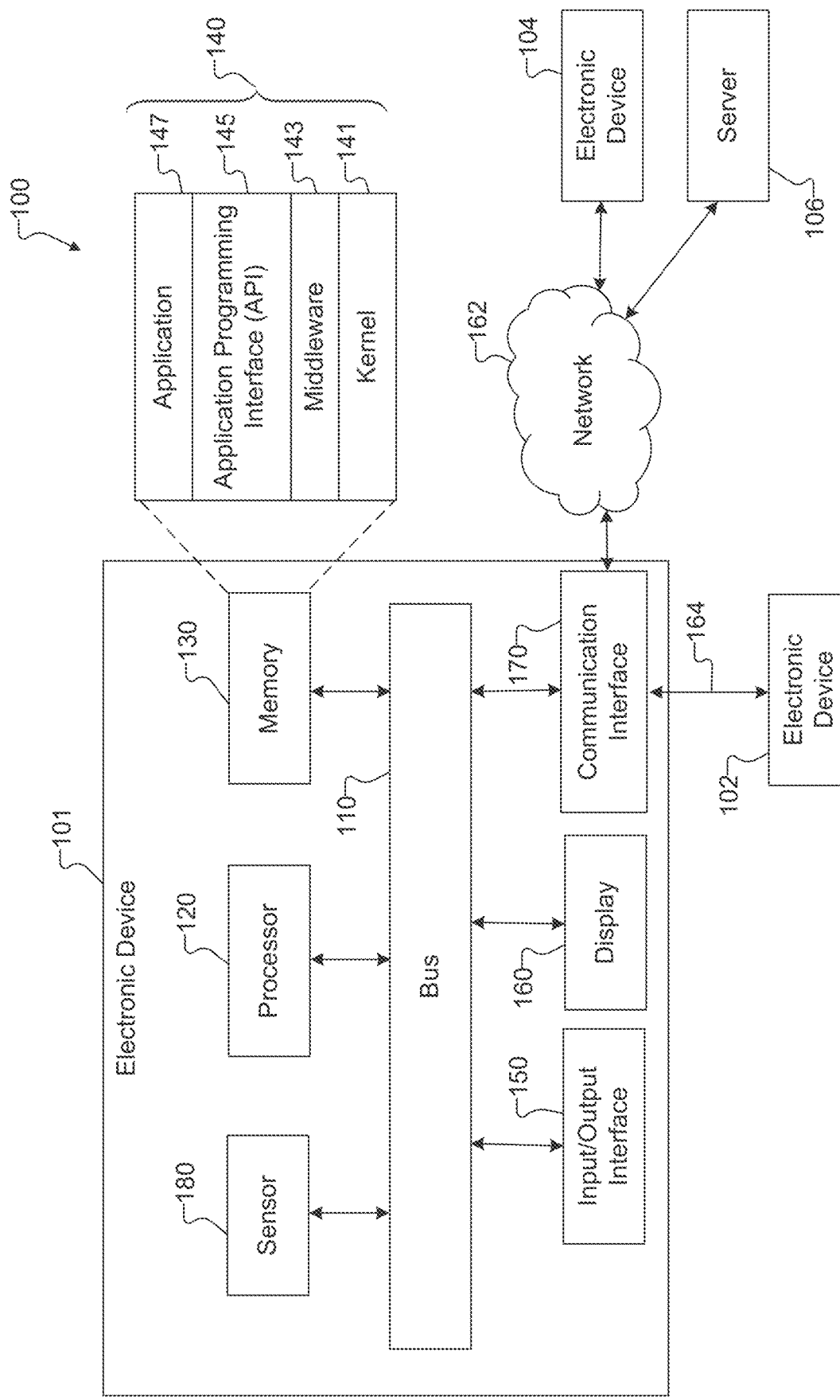
FIG. 1 illustrates an example network configuration including an electronic device in accordance with this disclosure.

FIGS. 1 through 11, described below, and the various embodiments of this disclosure are described with reference to the accompanying drawings. However, it should be appreciated that this disclosure is not limited to these embodiments and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. While effective, images captured using these devices may suffer from various shortcomings. For example, images captured using these devices may have relatively low image contrast. Moreover, due to limited knowledge of image processing pipelines, users generally do not want to take steps to manually enhance the image contrast of captured images.

A typical image processing pipeline may process multiple input frames, such as at least one exposure value (EV) EV-0 frame and at least one EV minus 2 (EV-2) frame. An EV-2 frame has a shorter exposure and is therefore darker compared to EV-0 frames. An EV-0 frame may be selected as a reference frame based on capturing the most dynamic range, and an EV-2 frame can have reduced exposure by two stops, which means it captures significantly less light. This allows the EV-2 frame to capture very bright portions in a scene. These frames can be combined in order to generate a high dynamic range (HDR) image. Lately, the resolution of imaging sensors has been increasing and may include up to 50 megapixels or more, and it can take a significant amount of time to process all of the pixels in multiple frames. Certain trade-offs can be made to reduce complexity and memory requirements in complex imaging pipelines, but these can result in negative effects like contrast loss.

This disclosure provides various techniques for locally-adaptive multi-scale image enhancement. As described in more detail below, an input frame can be downsampled, and global contrast enhancement of the input frame can be performed based on the downsampled input frame to generate a globally contrast-enhanced frame. Texture maps at different scale resolutions and clipped histograms at the different scale resolutions can be generated based on the downsampled input frame, and lookup tables (LUTs) can be generated at the different scale resolutions based on the texture maps and the clipped histograms. The LUTs at the different scale resolutions can be applied to the input frame in order to generate locally contrast-enhanced frames, and the locally contrast-enhanced frames and the globally contrast-enhanced frame can be blended to generate an output frame.

In this way, it is possible to enhance contrast in images based on a multi-scale approach while also making the contrast enhancement locally-adaptive to image contents. For example, the disclosed techniques may operate on tone-mapped images (where the dynamic range is already compressed, such as to an 8-bit depth). Rather than using a fixed tile size, tiles of different sizes can be used to enhance contrast at different scales. For example, larger tile sizes may be used for coarser scales, and smaller tile sizes may be used for finer scales. By doing this, an image can be analyzed at multiple scales by considering windows of different sizes for contrast enhancement. Thus, for instance, as tiles become smaller, more and more focus can be placed on local contrast enhancement. At each scale, it is possible to look at a neighborhood of tiles to see the contents in other tiles and enhance contrast in each tile by taking into account the contents of the current tile and the neighboring tiles. Contrast-enhanced images at different scales can be generated in this manner and combined, and local spatial adaptation can be used to reduce stains or other artifacts. To enable the blending, texture maps can be estimated separately at different scales. These texture maps enable smaller tiles to contribute more in the blending operation in textured areas and larger tiles to contribute more in non-textured areas. Among other things, these techniques can be used to obtain contrast-enhanced images while reducing or minimizing the creation of stains or other artifacts.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may obtain and process input images to perform locally-adaptive multi-scale image enhancement.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process input images to perform locally-adaptive multi-scale image enhancement. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that includes one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may obtain and process input images to perform locally-adaptive multi-scale image enhancement.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
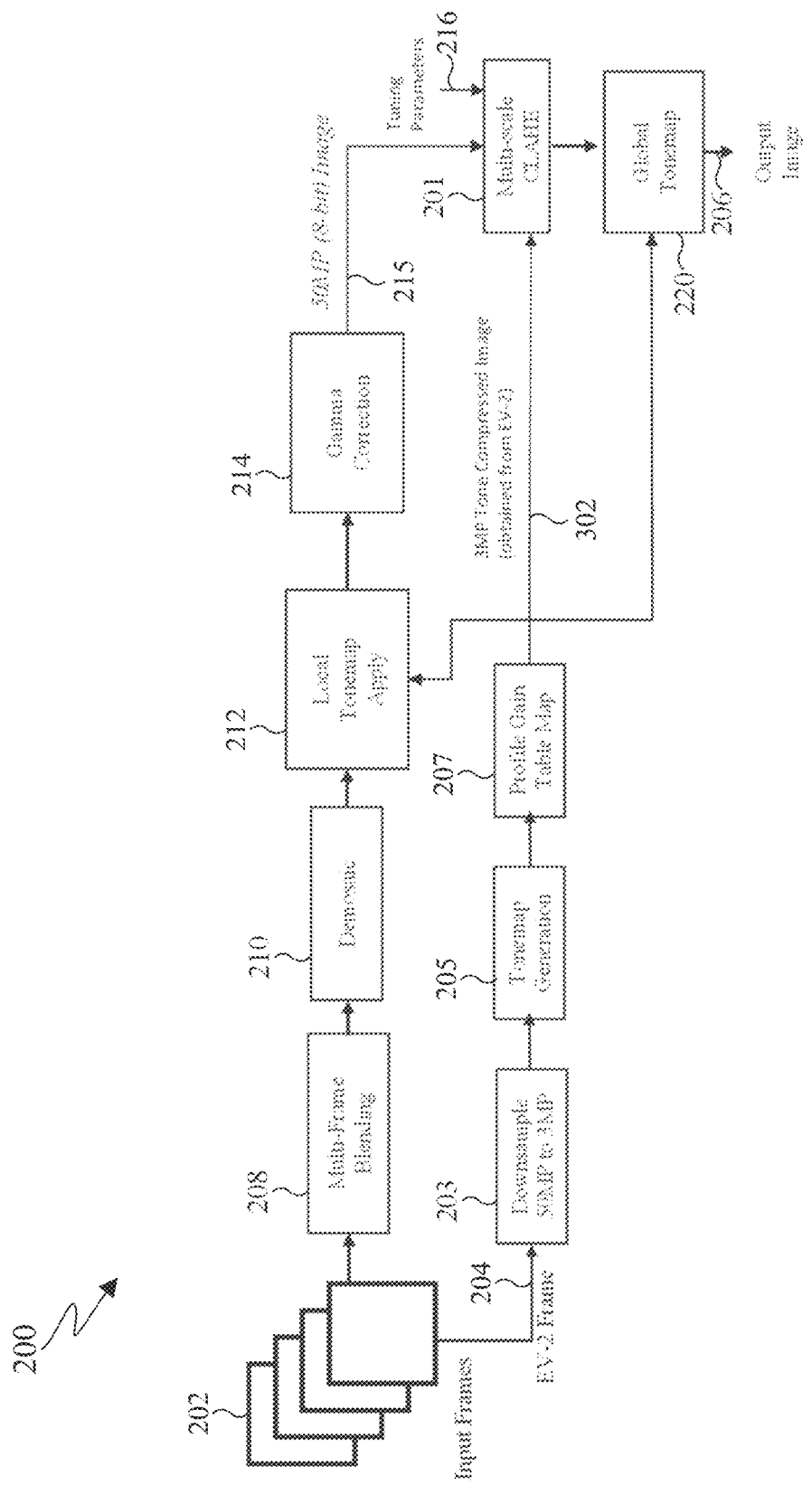
FIGS. 2A and 2B illustrate an example architecture for locally-adaptive multi-scale image enhancement in accordance with this disclosure.
Figure 2B:
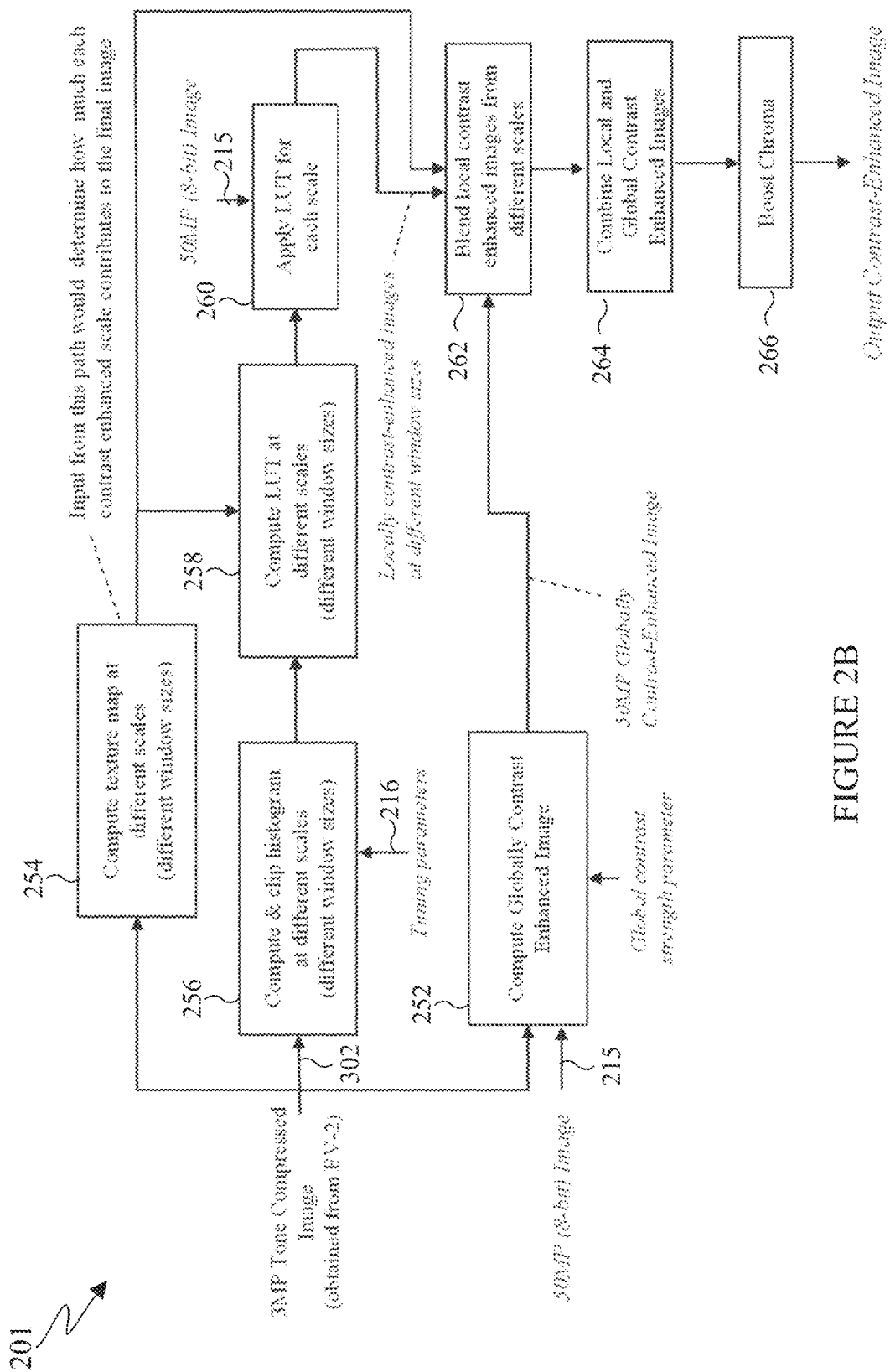

FIGS. 2A and 2B illustrate an example architecture 200 for locally-adaptive multi-scale image enhancement in accordance with this disclosure. For case of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2A, the architecture 200 generally operates to receive and process multiple input frames 202. The input frames 202 may be obtained from any suitable source(s), such as when the input frames 202 are captured using at least one camera or other imaging sensor 180 of the electronic device 101 during an image capture operation. In some embodiments, the input frames 202 represent raw image frames. Raw image frames typically refer to image frames that have undergone little if any processing after being captured. The availability of raw image frames can be useful in a number of circumstances since the raw image frames can be subsequently processed to achieve the creation of desired effects in output images. In many cases, for example, the input frames 202 can have a wider dynamic range or a wider color gamut that is narrowed during image processing operations in order to produce still or video images suitable for display or other use. The input frames 202 here may include any suitable number of input frames 202, such as two or more input frames 202. Each input frame 202 can have any suitable format, such as a Bayer or other raw image format, a red-green-blue (RGB) image format, or a luma-chroma (YUV) image format. Each input frame 202 can also have any suitable resolution, such as up to fifty megapixels or more.

The input frames 202 include images captured using different capture conditions. The capture conditions can represent any suitable settings of the electronic device 101 or other device used to capture the input frames 202. For example, the capture conditions may represent different exposure settings of the imaging sensor(s) 180 used to capture the input frames 202, such as different exposure times or ISO settings. As a particular example, some of the input frames 202 can have shorter exposure values, such as when the input frames 202 include at least one EV−2 frame 204. Others of the input frames 202 can have higher exposure values, such as when the input frames 202 include at least one EV−0 frame. In some cases, the EV−0 frame can be used as a reference frame based on capturing the most dynamic range of the input frames 202. The EV−2 frame(s) 204 may capture brighter portions in a scene since reducing exposure by two stops allows significantly less light to be captured, which exposes brighter portions of the scene. The input frames 202 can be combined to generate an HDR output image 206.

Since the input frames 202 may have high resolutions, it may take an extensive amount of time to process all pixels in the input frames 202. As a result, a multi-frame blending operation 208 can be performed in one branch, and a tone mapping generation operation 205 can performed in another branch in parallel with the multi-frame blending operation 208.

Figure 3:
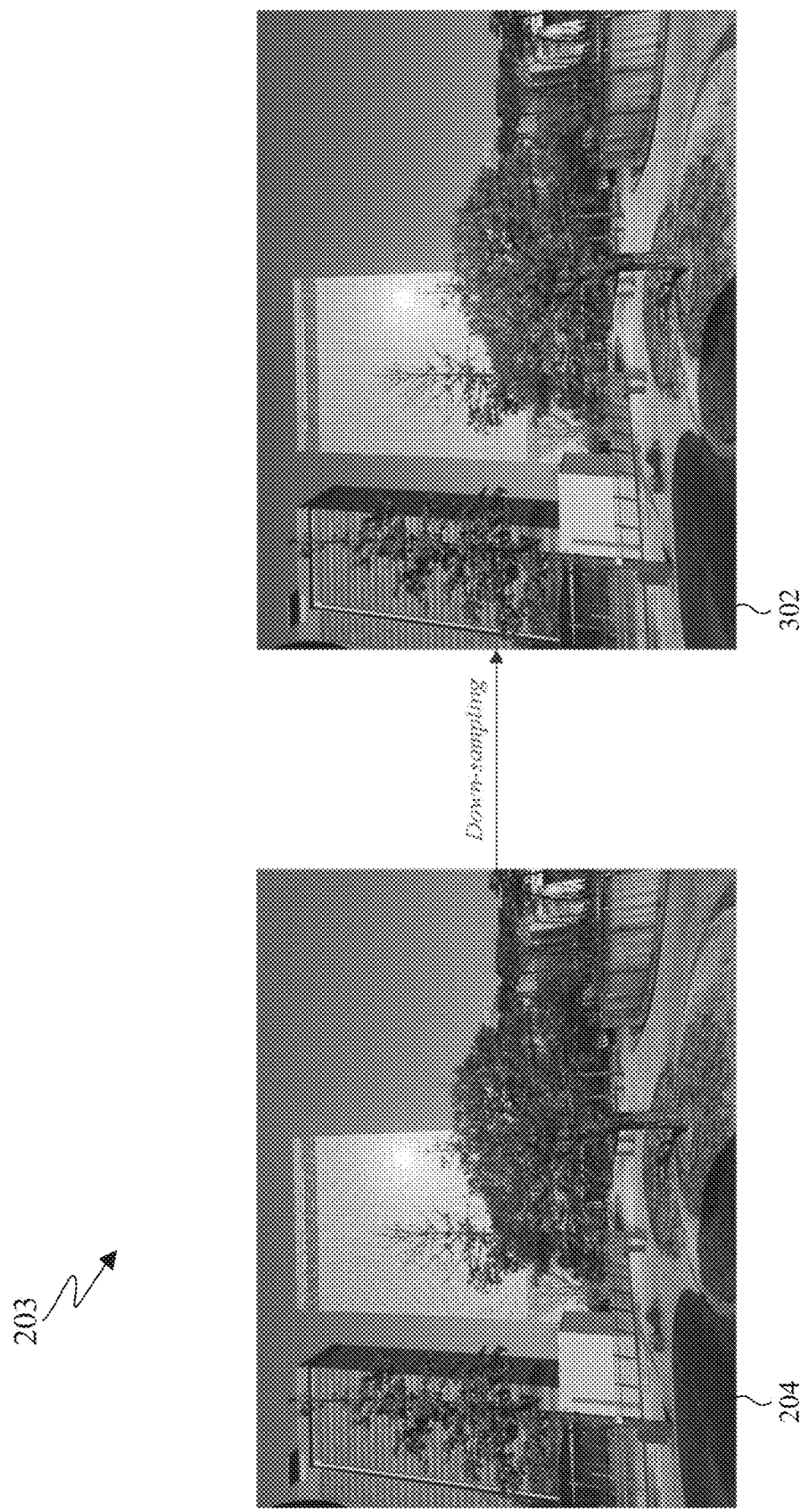
FIG. 3 illustrates an example downsampling operation in accordance with this disclosure.

FIG. 3 illustrates an example downsampling operation 203 in accordance with this disclosure. As shown in FIG. 3, the downsampling operation 203 can reduce the 50-megapixel EV−2 frame 204 into a 3-megapixel downsampled frame 302, such as a luma frame. Downsampling allows for faster processing while retaining enough details for the purposes of multi-scale contrast enhancement operation 201. In some embodiments, the downsampling operation 203 can transform an RGB image into a luminance image. A grayscale representation of the input frame 204 allows for only brightness information to be considered, since color information has been removed (which may be due to the color information not being useful or important for contrast enhancement and tone mapping purposes).

Continuing in the lower branch of FIG. 2A, the downsampled frame 302 is provided to a tone mapping generation operation 205. A tone map can control how an image is displayed on a specified screen, such as a smartphone screen, a TV screen, a computer monitor, or any other suitable screen. Most of these screens have lower dynamic ranges as compared to the dynamic range of the data being captured. For example, display equipment might only allow for display of 256 unique levels of brightness while the data is captured at ten bits. Going two EV stops lower increases the dynamic range further by four bits, which results in fourteen-bit data. The tone mapping operation squeezes a range of pixels at fourteen-bit data into a range of pixels for an eight-bit display.

The downsampled frame 302 and the tone maps are provided to a profile gain table map operation 207. A profile gain table map can be used to encode the tone mapping results in terms of one or more lookup tables. One possible reason for encoding the tone mapping results into a profile gain table map is because an EV−2 frame is used to generate the tone mapping results, while a reference frame in blending operations does not necessarily have to be an EV−2 frame. For example, the reference frame could be an EV−0 frame or any other suitable frame. When a different frame is used as a reference frame, the tone mapping information can be encoded into a different representations. This can avoid discrepancies while using different frames for tone mapping generation and blending operations. Also, a reference frame in different processing branches might be different. Separate frames used in a tone mapping operation can have lower EV levels due to better preservation of information in saturated areas and brighter portions as compared to regular exposed frames, which are known as the EV−0 frames. However, the EV−0 frame can be used in the upper processing branch due to better overall quality.

In the upper branch of FIG. 2A, the multi-frame blending operation 208 generally operates to combine image data contained in the input frames 202 in order to generate a blended image. For instance, the multi-frame blending operation 208 may process the input frames 202 in order to modify portions of a selected reference frame using image data from one or more non-reference frames. As a particular example, the multi-frame blending operation 208 can blend non-reference image frames with a reference image frame in non-motion areas to improve the signal-to-noise ratio. As another particular example, the multi-frame blending operation 208 may replace the brighter portions of a blended frame with corresponding portions from a shorter-exposure image frame. In some cases, the multi-frame blending operation 208 may perform a weighted blending operation to combine the pixel values contained in the input frames 202. Note, however, that this disclosure is not limited to any particular technique(s) for combining image frames.

The blended image is provided to a demosaic operation 210, which generally operates to convert image data produced using a Bayer filter array or other color filter array into reconstructed red-green-blue (RGB) data or other image data in order to generate a demosaiced image. For example, the demosaic operation 210 can perform various interpolations to fill in missing information, such as by estimating other colors' image data for each pixel. When using a Bayer filter array or some other types of color filter arrays, approximately twice as many pixels may capture image data using green filters compared to pixels that capture image data using red or blue filters. This can introduce non-uniformities into the captured image data, such as when the red and blue image data each have a lower signal-to-noise ratio (SNR) and a lower sampling rate compared to the green image data. Among other things, the green image data can capture high-frequency image content more effectively than the red and blue image data. The demosaic operation 210 can take information captured by at least one highly-sampled channel (such as the green channel and/or the white channel) and use that information to correct limitations of lower-sampled channels (such as the red and blue channels), which can help to reintroduce high-frequency image content into the red and blue image data. Note, however, that this disclosure is not limited to any particular technique(s) for demosaicing images.

The demosaiced image from the demosaic operation 210 and the tone maps from the tone map generation operation 205 are provided to a local tone mapping application operation 212, which generally operates to apply local tone mapping to the demosaiced image in order to generate a locally-tone mapped image. Local tone mapping typically involves applying different tone mappings to different areas of an image. As such, the local tone mapping is often referred to as a spatially-varying tone mapping operation. In some embodiments, the extent of a local area may be either a fixed-size window or a variable window, and areas may further be defined as variable-sized blobs where each blob has a homogenous illumination characteristic and adjacent blobs do not share the same property. The local tone mapping application operation 212 may use any suitable technique(s) to perform local tone mapping.

The locally-tone mapped image may optionally be provided to a gamma correction operation 214, which generally operates to process the locally-tone mapped image in order to lower the dynamic range of the locally-tone mapped image and generate a lower-dynamic range image 215. For example, the gamma correction operation 214 may reduce the bit depth of the image data in the locally-tone mapped image so that the image data in the lower-dynamic range image has fewer bits. The gamma correction operation 214 may use any suitable technique(s) for performing gamma correction and lowering the dynamic range of an image. In some embodiments, for instance, the gamma correction operation 214 may use a gamma correction lookup table (also known as a gamma curve) to perform the gamma correction. The gamma correction lookup table may include a mapping that can be used to convert values associated with the locally-tone mapped image into values associated with the lower-dynamic range image.

The lower-dynamic range image 215 is provided to a multi-scale contrast enhancement operation 201, which generally operates to adjust the contrast within the corrected lower-dynamic range image. For example, the multi-scale contrast enhancement operation 201 can perform contrast-limited adaptive histogram equalization (CLAHE) at a multi-scale of the corrected lower-dynamic range image. CLAHE is an image processing technique in which histogram of an image (or a section of image) is computed and used to redistribute the pixel intensities so that all the possible intensities have roughly the same number of pixels.

As a particular example, the multi-scale contrast enhancement operation 201 can increase contrast that was lost in prior operations, such as by making lighter pixels brighter and dark pixels darker. The results of the single-scale contrast enhancement can be combined with the results of a multi-scale contrast enhancement operation 201 (described below) to generate a contrast-enhanced image. The multi-scale contrast enhancement operation 201 may use any suitable technique(s) for performing contrast enhancement, such as by using CLAHE or other form of adaptive histogram equalization or other contrast enhancement technique.

Tuning parameters 216 are also provided to the multi-scale contrast enhancement operation 201. The tuning parameters 216 can be stored on an electronic device 101, provided by a user, or obtained in any other suitable manner. In some cases, the tuning parameters 216 can include local contrast strength parameters and a texture clipping parameter $T_{min}$. Both the local contrast strength parameters and the texture clipping parameter may help in determining a clip limit for the computed histograms (discussed below).

As shown in FIG. 2B, the multi-scale contrast enhancement operation 201 generally operates to process a shorter-exposure frame, such as an EV−2 frame 204, to compute the lookup tables and apply the lookup tables to the lower-dynamic range image 215. When capturing multi-frame images, the main frame that captures most of the dynamic range can be defined as EV−0, meaning an exposure value of zero. After that, each EV step reduction is equivalent to reduction in the exposure by a factor of two. Therefore, EV−2 frame can capture about 75% less light as compared to EV−0 frame. This serves the purpose of capturing extremely bright areas in a scene without overexposing them. These EV−2 images are typically blended with EV−0 image to produce a higher dynamic range image.

The EV−2 frame 204 can be a shorter-exposure frame than a reference frame used in the upper branch of the architecture 200 in FIG. 2A. The EV−2 frame 204 is provided to a downsampling operation 203, which generally operates to downsample the EV−2 frame 204 and produce an image frame having a lower resolution. In this example, the downsampling operation 203 is shown as downsampling 50-megapixel image frames into 3-megapixel image frames, although these resolutions are for illustration only and other resolutions can be chosen. Also, the downsampling operation 203 is optional and need not be performed here.

Figure 4:
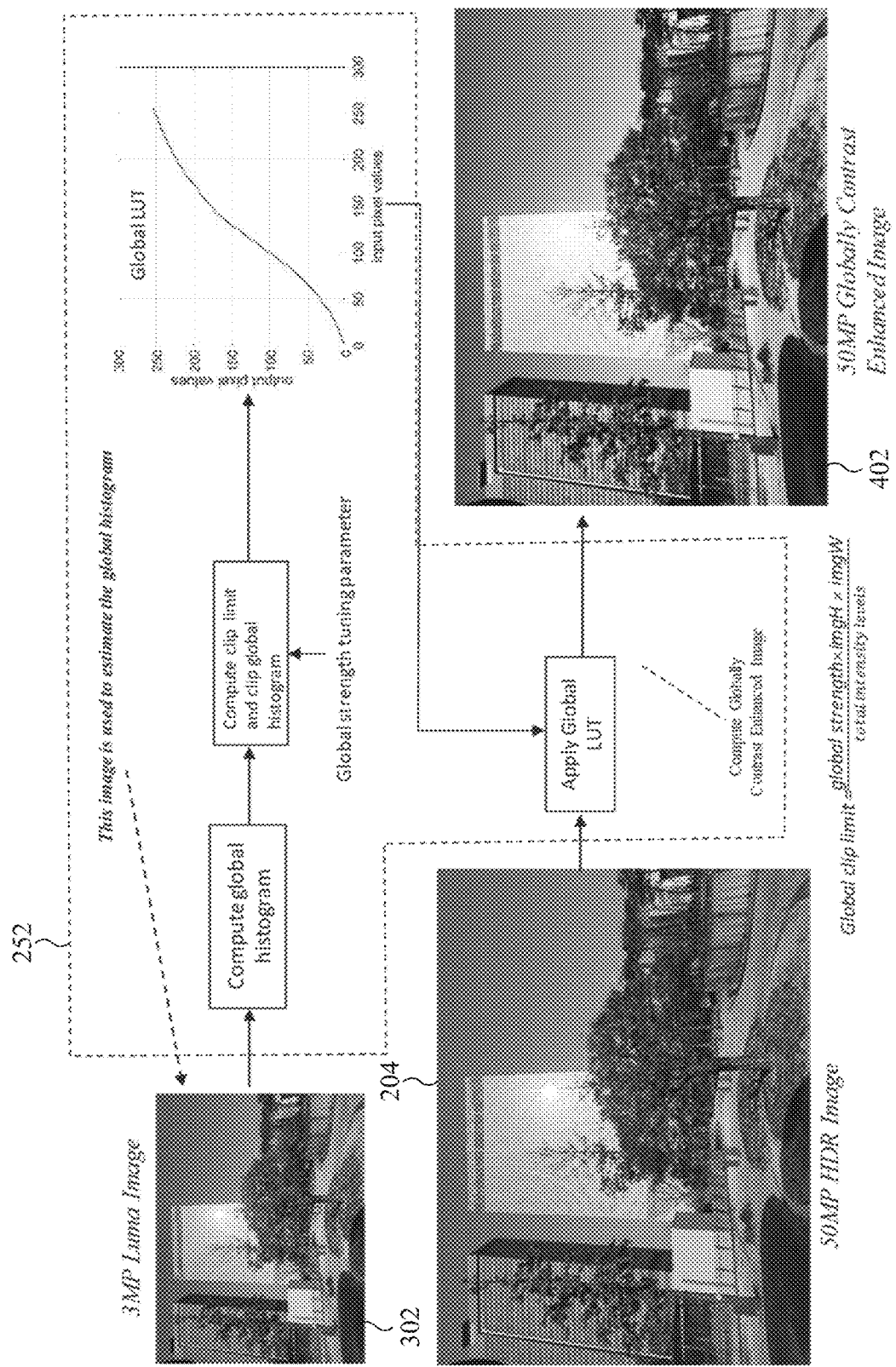
FIG. 4 illustrates an example global contrast operation in accordance with this disclosure.

The downsampled frame 302 is provided to a global contrast operation 252, which generally operates to apply global image enhancement to the EV−2 frame 204 based on the downsampled frame 302 in order to generate a globally contrast-enhanced frame. For example, the global contrast operation 252 can generate a global histogram using the downsampled frame 302 and perform global contrast enhancement of the input frame 204 using the global histogram. FIG. 4 illustrates an example global contrast operation 252 in accordance with this disclosure. As shown in FIG. 4, the global contrast operation 252 can enhance global contrast instead of local contrast, and a globally-enhanced frame 402 can be generated by increasing global contrast in the input frame 204 using the downsampled frame 302. In some cases, a global lookup table (LUT) can be determined using the downsampled frame 302 and applied to the input frame 204, which results in the globally-enhanced frame 402 (where contrast is enhanced globally in the frame 402). An image histogram captures the statistics of pixels. For example, in case of an 8-bit image, total possible pixel values are 256 and a histogram captures the proportion of the number of pixels attaining each of these 256 values. This histogram is then used to compute a mapping function that translates these input pixel values in to output pixel values to enhance the contrast. Since there are only 256 input possibilities, this transformation is precisely expressed as a look up table.

Figure 5A:
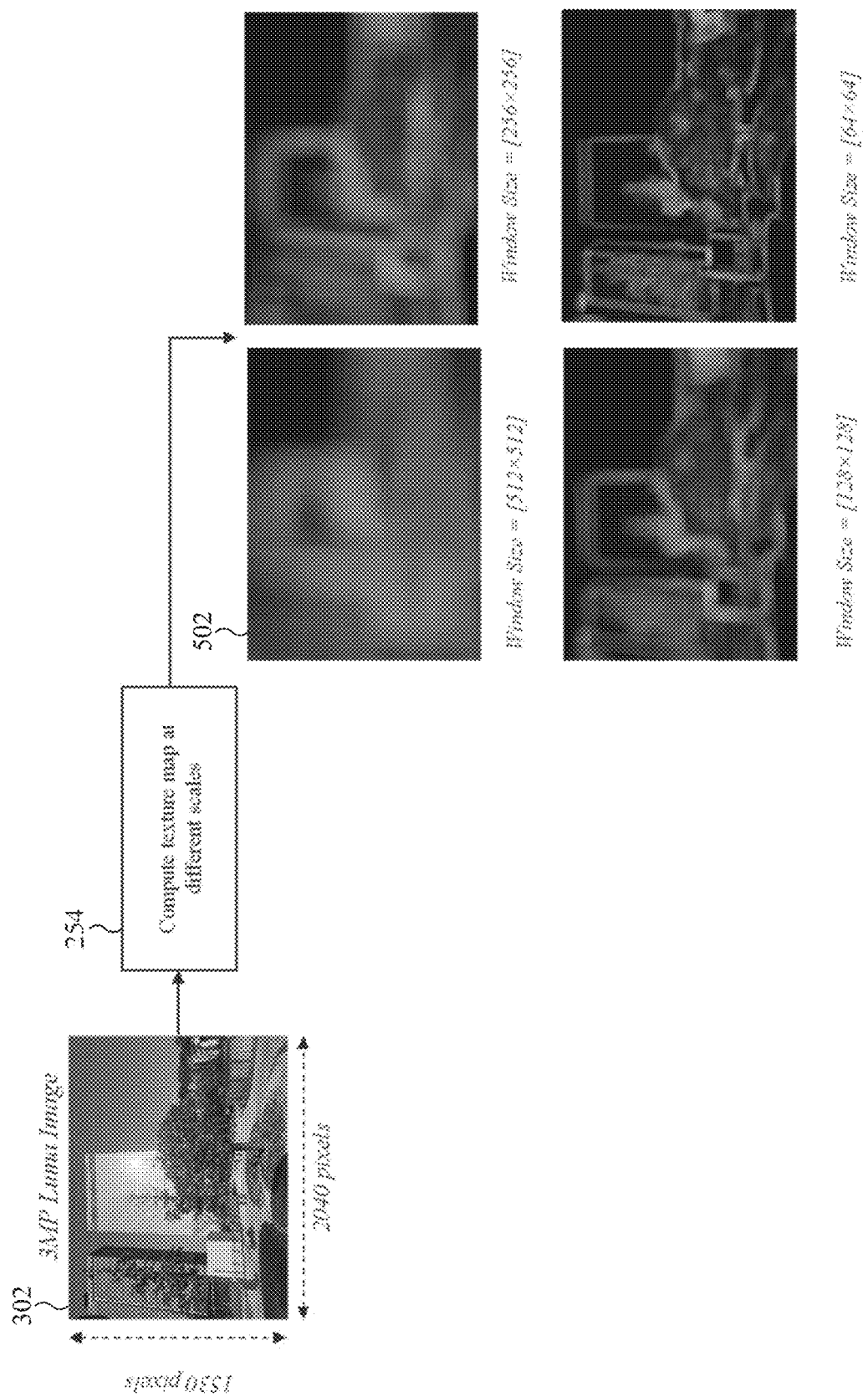
FIGS. 5A through 5D illustrate an example texture mapping operation in accordance with this disclosure.

A texture mapping operation 254 generally operates to produce texture maps at different scale resolutions based on the downsampled frame 302. FIGS. 5A through 5D illustrate an example texture mapping operation 500 in accordance with this disclosure. As shown in FIG. 5A, the texture mapping operation 500 processes the downsampled frame 302 and generates texture maps 502 at different scales. In this example, four different scales are used to generated four different texture maps 502 from the downsampled frame 302, where each texture map 502 corresponds to a specific scale. As can be seen here, using a larger window size results in a coarser texture map 502 than using a smaller window size. The texture map corresponding to large window sizes contains more high-level or abstract information about the location(s) of texture in an image. In some embodiments, multiple input frames can be blended using the texture maps 502, such as when the texture maps 502 inform how to blend multiple contrast-enhanced frames into a single frame.

Figure 5B:
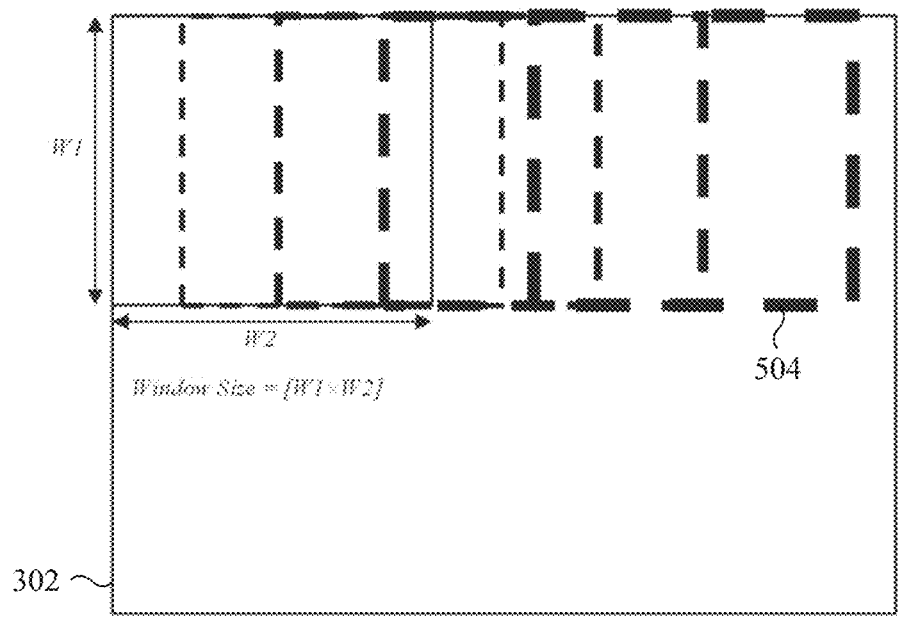

FIG. 5B illustrates one example of how a local mean and a local variance of the downsampled frame 302 can be computed. A window size for a window 504 is selected for the computation here. For example, the window 504 can have a window size of 128 pixels by 128 pixels, although any other suitable dimensions may be used here. The window 504 can be spatially moved with some amount of overlap, meaning one position of the window 504 overlaps somewhat with another position of the window 504. A local mean and a local variance can be computed for the window 504 at each location. Because there is overlap between successive tile locations, integral representations of the images can be used to compute the local mean and the local variance. Each texture map 502 can be generated using the local means and the local variances of the windows 504 here.

Figure 5C:
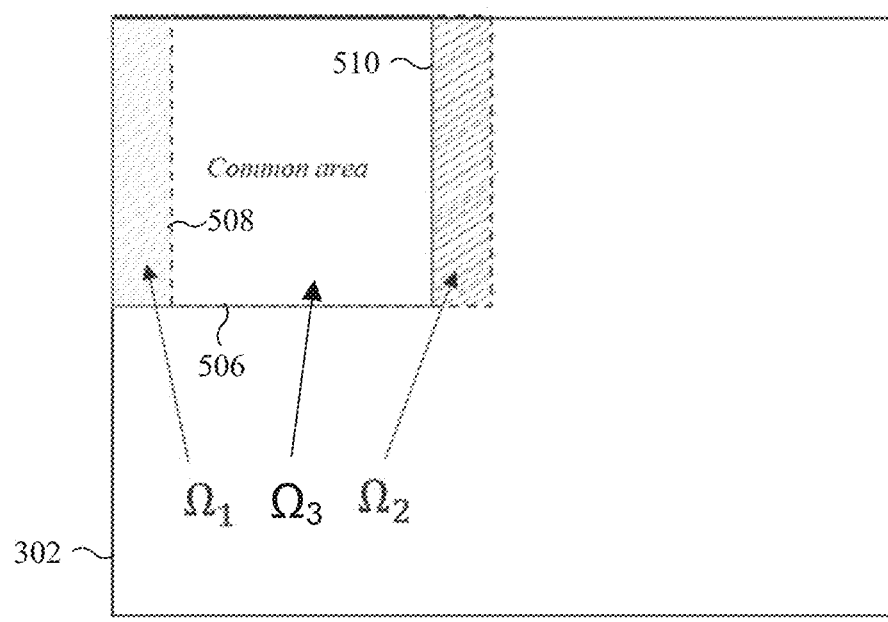

FIG. 5C illustrates another example of how a local mean and a local variance of the downsampled frame 302 can be computed. Here, a local mean and a local variance can be computed using an overlapping area 506, a first unique area 508, and a second unique area 510 of two successive tile locations. The overlapping area 506 represents the area of the image that is included in both successive tile locations. The first unique area 508 represents an area of the image included in a first tile but not included in a second tile, and the second unique area 510 represents an area of the image included in the second tile but not included in the first tile. A local mean can be defined as the sum of the values of all pixels in a tile divided by a total number of pixels in a frame. Thus, the mean $\mu_r$ of the first tile and the mean $\mu_g$ of the second tile can therefore be defined in the following manner.

$$\mu_r = \frac{1}{n} \sum\nolimits_{i \in (\Omega_1 \cup \Omega_3)} x_i \tag{1}$$

$$\mu_g = \frac{n\mu_r - \sum\nolimits_{i \in \Omega_1} x_i + \sum\nolimits_{i \in \Omega_2} x_i}{n} \tag{2}$$

Here, n represents a total number of pixels in each tile, $\Omega_1$ represents a set of all pixels in the first unique area 508, $\Omega_2$ represents a set of all pixels in the second unique area 510, and $\Omega_3$ represents a set of all pixels in the common area 506. A local variance can be defined as the value of the local mean squared subtracted from a sum of the values of the pixels squared for a tile. Thus, the local variance $s_r^2$ of the first tile and the local variance $s_g^2$ of the second tile can be defined in the following manner.

$$s_r^2 = \frac{1}{n} \sum\nolimits_{i \in (\Omega_1 \cup \Omega_3)} x_i^2 \tag{3}$$

$$s_g^2 = \frac{s_r^2 - \sum_{i \in \Omega_1} x_i^2 + \sum_{i \in \Omega_2} x_i^2}{n} - \mu_g^2 \quad (4)$$

Note that, in order to save computation resources, only the second unique area 510 may need to be computed after pixels of the first tile are computed. That is, in order to compute the second unique area 510, the values of the pixels in the overlapping area 506 can be determined by removing the values of the pixels in the first unique area 508 from the first tile.

Figure 5D:
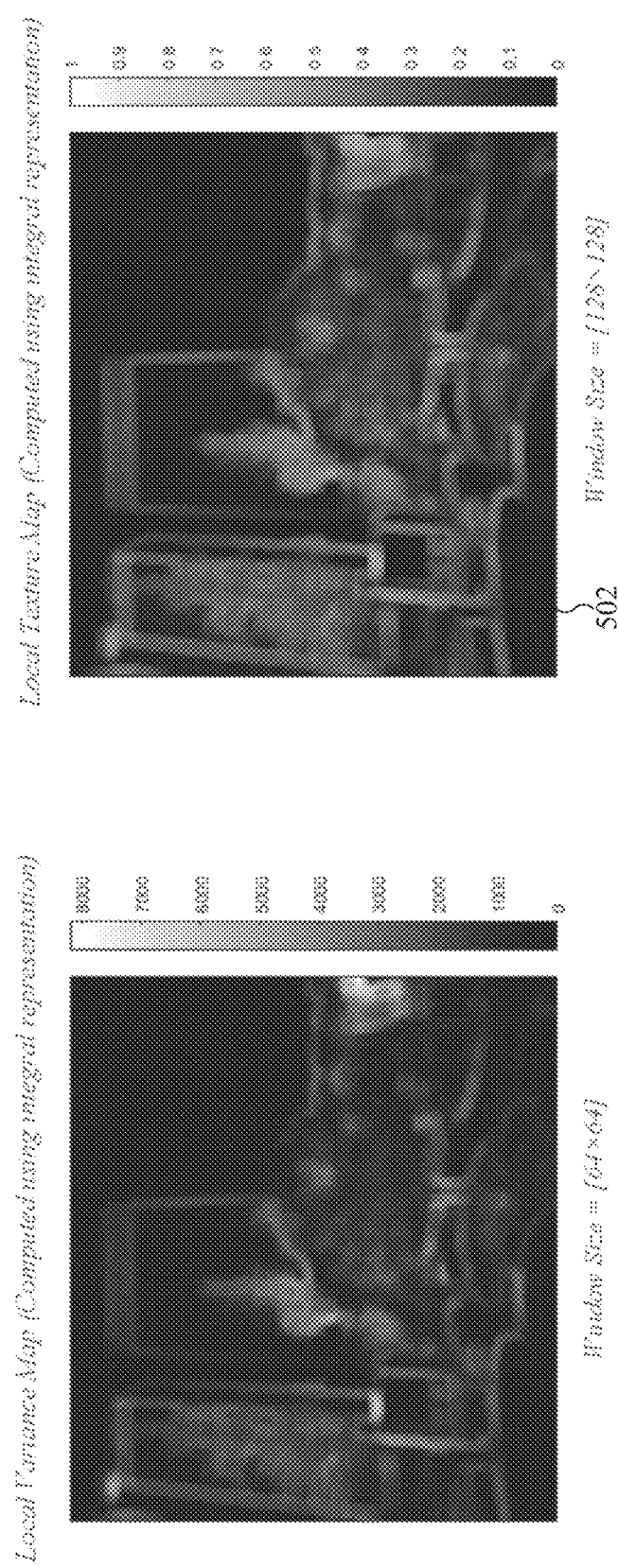

As shown in FIG. 5D, each texture map 502 can be computed using local variance maps. A variance map $V^k(i, j)$ can be defined in the following manner.

$$T^k(i, j) = \frac{V^k(i, j)}{V^k(i, j) + \epsilon^2} \quad (5)$$

Here, (i, j) represents a pixel location, $\epsilon$ represents a constant parameter, and $k \in \{0, 1, 2, 3, \ldots, K\}$ represents a scale index such that k=0 corresponds to a largest window size (scale) and k=K corresponds to a smallest window size (scale) in computing variance maps. In some embodiments, a typical value for $\epsilon$ can be 64. The texture maps 502 show information regarding texture within the EV-2 frame. For example, regions that have a lot of variations, such as grass, trees, leaves, and building windows, tend to be whiter (with higher values), and regions that have less variations tend to be darker (with lower values).

Figure 6A:
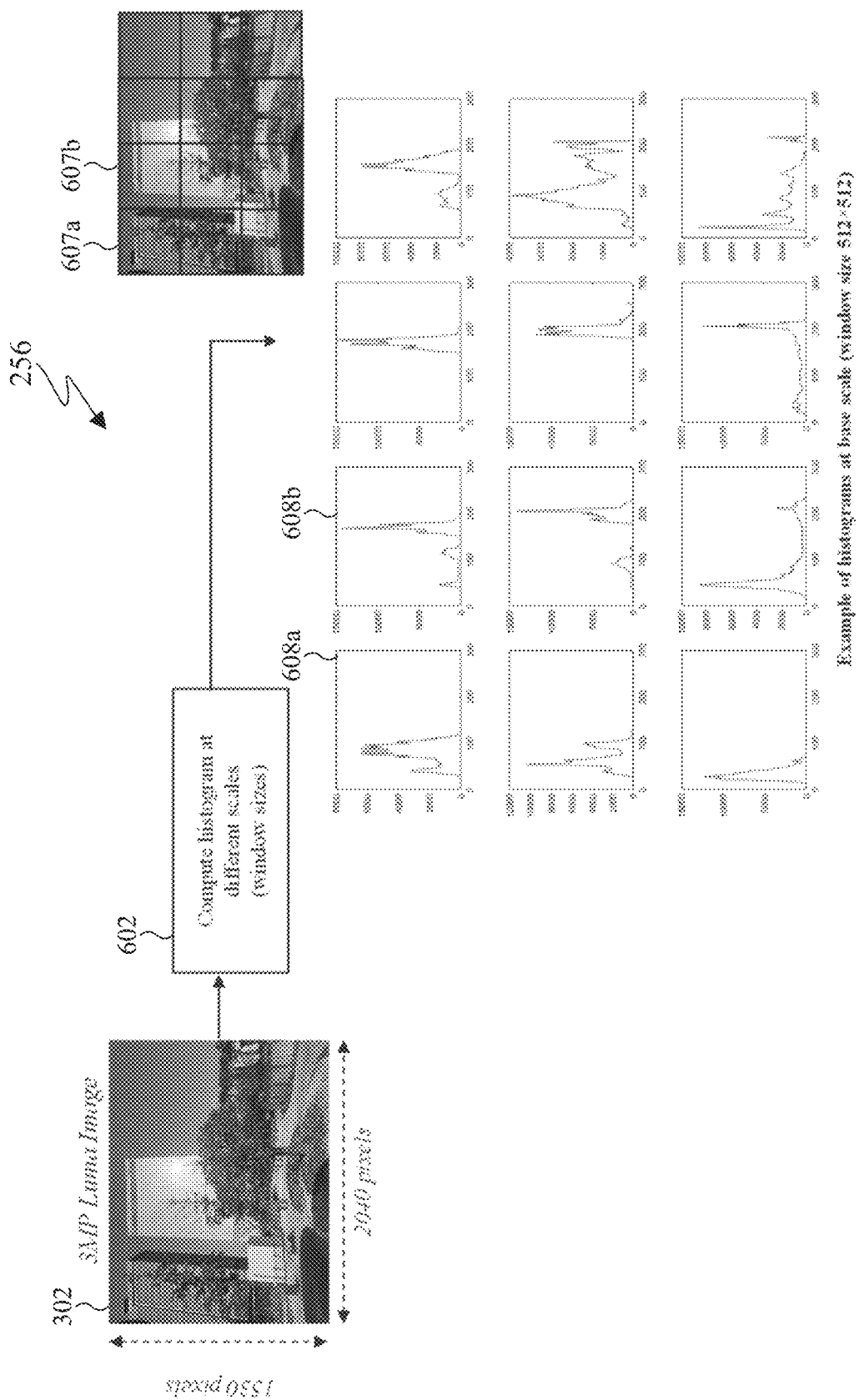
FIGS. 6A and 6B illustrate an example histogram operation in accordance with this disclosure.
Figure 6B:
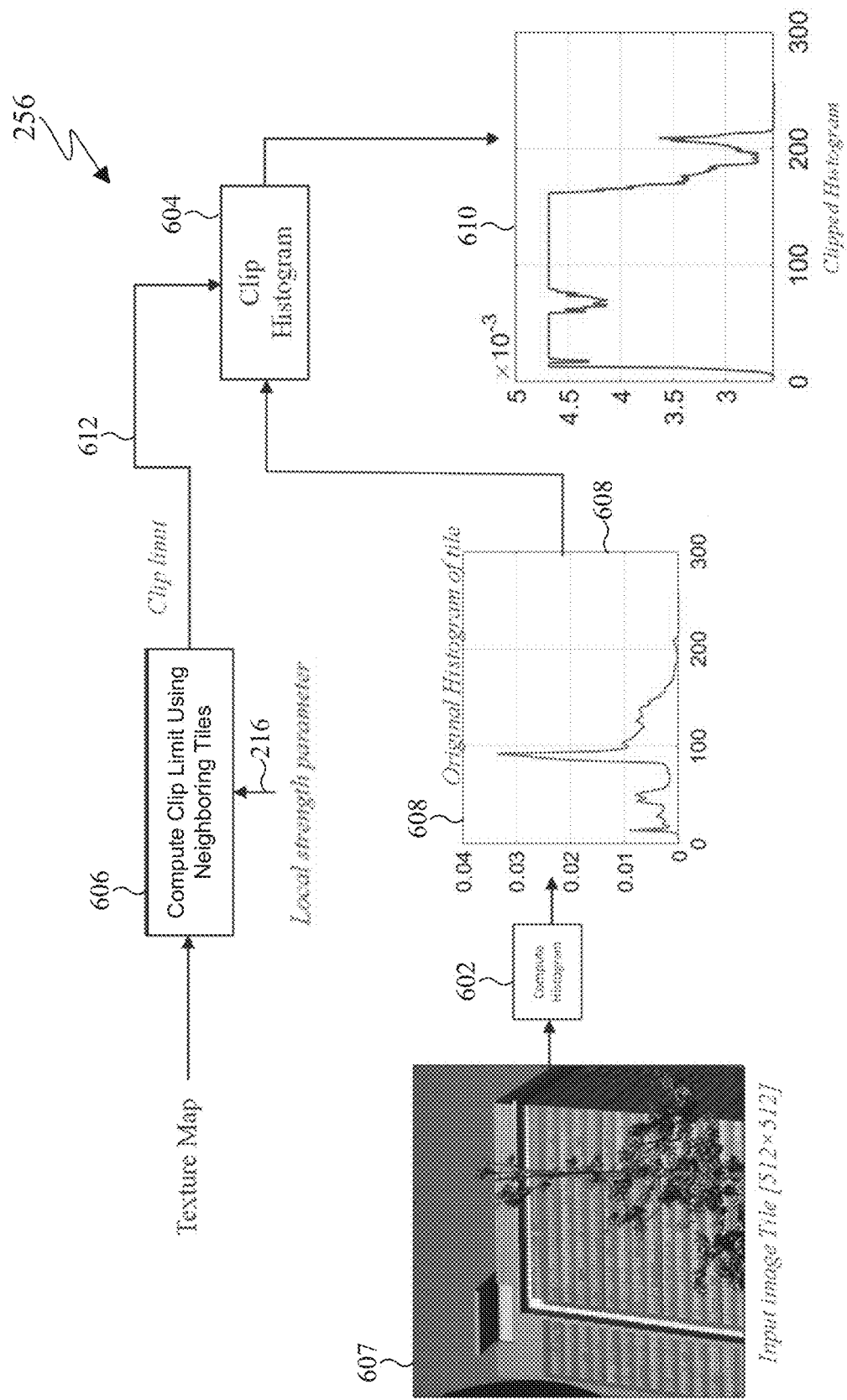

A histogram operation 256 generally operates to produce clipped histograms at the different scale resolutions based on the downsampled frame 302. FIGS. 6A and 6B illustrate an example histogram operation 256 in accordance with this disclosure. As shown in FIGS. 6A and 6B, the histogram operation 256 can be performed using the downsampled frame 302 to compute histograms at different scales. While FIGS. 6A and 6B show histograms 608 and clipped histograms 610 for a single scale, the histogram operation 602 can be repeated for each of the scales.

As shown in FIG. 6A, a compute histogram operation 602 can compute histograms 608 for tiles 607 with different window sizes for each scale. A histogram 608 can show a distribution of pixel values in a tile 607, where the number of pixels with each value are counted and the resulting value is plotted in a chart. Tiles 607b with many bright pixels will have a peak further to a right side of a histogram 608b, and tiles 607a with many dark pixels will have a peak further to the left side of the histogram 608a. As shown in FIG. 6B, a compute clip limit operation 606 can use neighboring tiles 607b at each scale to compute a locally-adapted clip limit. In some cases, the neighboring tiles 607b of a current tile 607a can include the eight tiles above, below, to the left, to the right, and diagonally from the current tile 607a. In some cases, the texture maps 502 from the neighboring tiles can be used to determine the clip limit, such as in the following manner.

```
For i=1 to M      /* M is number of tiles in vertical direction*/
  For j=1 to N    /* N is number of tiles in horizontal direction*/
    ρ ← 0.01    /* For enhancing contrast in less textured areas. Other
                   values of p are also possible */
    x_c, y_c←getTileCenterPixelCoordinates(i,j)
    T_min ← T(x_c, y_c)
    For i_n, j_n ∈ Neighbors(i,j)
      x_n, y_n←getTileCenterPixelCoordinates(i_n, j_n)
      If T(x_n, y_n) < T_min
        T_min←T(x_n, y_n)
      End If
    End For
    clipLimit(i,j) = (NumOfPixelsInTile/TotalIntensityLevels) .* 2.0 .*
    (ρ.* localContrastStrength + localContrastStrength .* T_min)
  End For
End For
```

For each tile 607, an amount of texture information can be identified in the neighboring tiles 607b. The tile 607 with the least amount of texture present can be used to limit the strength of the contrast enhancement. For example, if a current tile 607a under consideration is in a region where neighboring tiles 607b do not contain lots of texture, the current tile 607a may not be enhanced in a manner that causes it to stand out or may produce stain artifacts. By using the information of the texture from the neighborhood, stain artifacts in regions, such as tall building edges, can be reduced or minimized. In the pseudocode above, the value localContrastStrength represents a tuning parameter. In some embodiments, a mean of the textures in the entire neighborhood can be computed and used in place of the texture clipping parameter $T_{min}$.

To compute a minimum texture value, the texture values of central pixels in neighboring tiles can be compared. In some cases, the texture of a center pixel for a tile is compared to a current minimum. If the texture value of the center pixel in a neighboring tile is lower than the current minimum, the minimum texture value is updated. The local contrast strength parameters can be different for each histogram at each scale. A higher value of the minimum texture value can provide a higher clip limit 612, which means more contrast enhancement. A lower value of the minimum texture value provides a lower clip limit 612, which mean less contrast enhancement. The histograms 608 are processed by a clip histogram operation 604 to maintain an appropriate level of contrast enhancement. For example, the histograms 608 can be clipped at a specified value in order to generate the clipped histograms 610, which can limit the contrast enhancement. As a particular example, the histograms 608 can be clipped at a value around $4.5 \times 10^{-3}$ (although this value is for illustration only).

Figure 7:
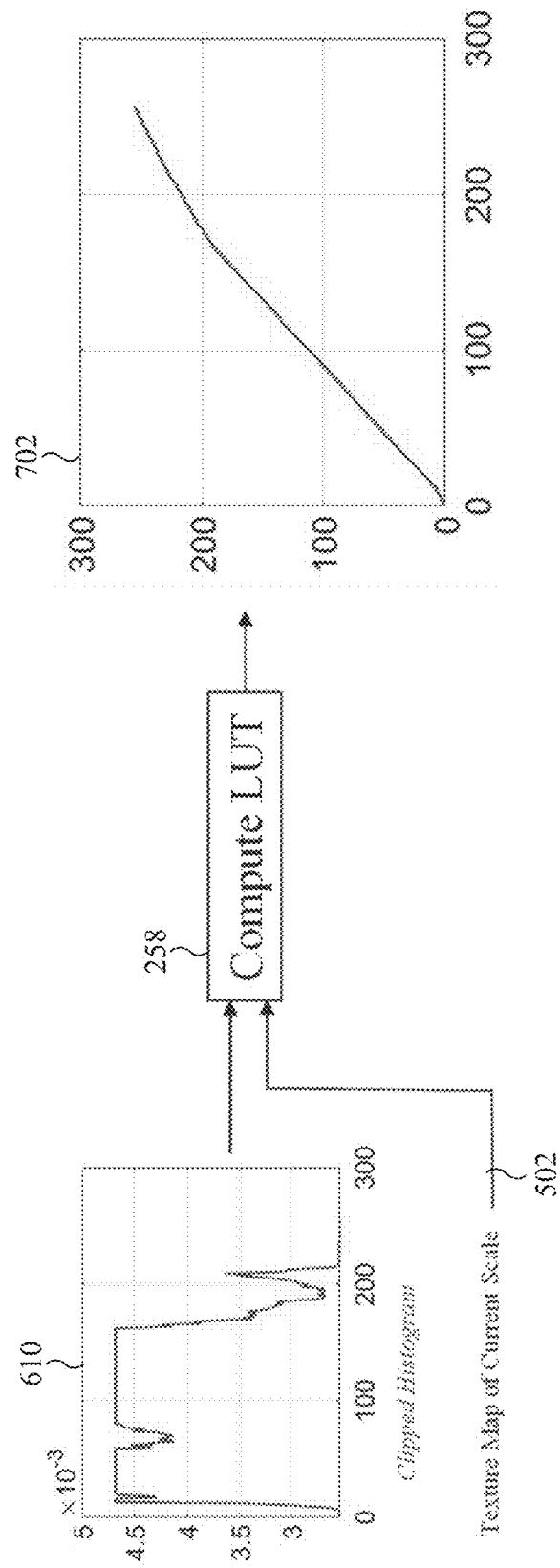
FIG. 7 illustrates an example lookup table computation operation in accordance with this disclosure.

A lookup table computation operation 258 generally operates to process the texture maps 502 and the clipped histograms 610 and generate lookup tables (LUTs) to be used for image enhancement. FIG. 7 illustrates an example lookup table computation operation 258 in accordance with this disclosure. As shown in FIG. 7, the different clipped histograms 610 can be used to compute LUTs 702. In some cases, an LUT 702 is a running integral or a cumulative sum of the values of a specified clipped histogram 610, where the counts of the values in the clipped histogram 610 are summed moving from left to right in the LUT 702. An LUT 702 can be generated for each of the clipped histogram 610. Also, at each resolution, a set of LUTs 702 can be generated based on window size of the tiles 607. For example, a total of twelve LUTs 702 can be generated based on a 512 by 512 window size, and 48 LUTs 702 can be generated based on a 256 by 256 window size. A group of lookup tables corresponds to each of the scales used in the architecture 200.

Figure 8:
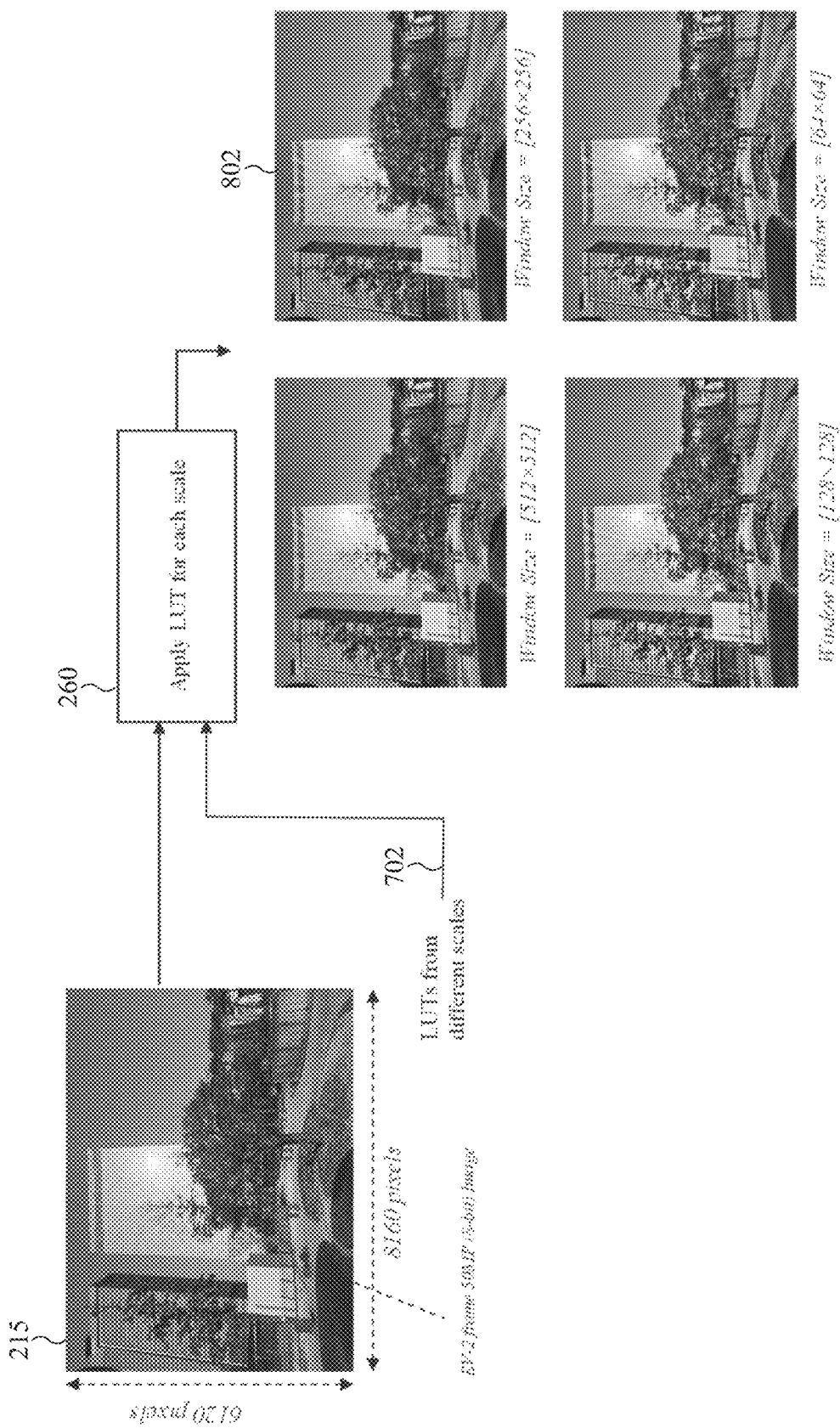
FIG. 8 illustrates an example lookup table application operation in accordance with this disclosure.

A lookup table application operation 260 generally operates to apply the LUTs 702 to the blended frame 215 in order to generate locally contrast-enhanced frames. FIG. 8 illustrates an example lookup table application operation 260 in accordance with this disclosure. As shown in FIG. 8, each LUT 702 is applied to the blended frame 215 at each scale in the LUT application operation 260 in order to generate locally contrast-enhanced frames 802. For example, when using four different scales, four different locally contrast-enhanced frames 802 can be generated. In some cases, for each scale, the input frame 202 can be broken into windows according to a window size of a specified scale, and the LUTs 702 at each scale can be bilinearly interpolated for a smooth transition between different tiles and windows when applying the LUTs 702.

Figure 9:
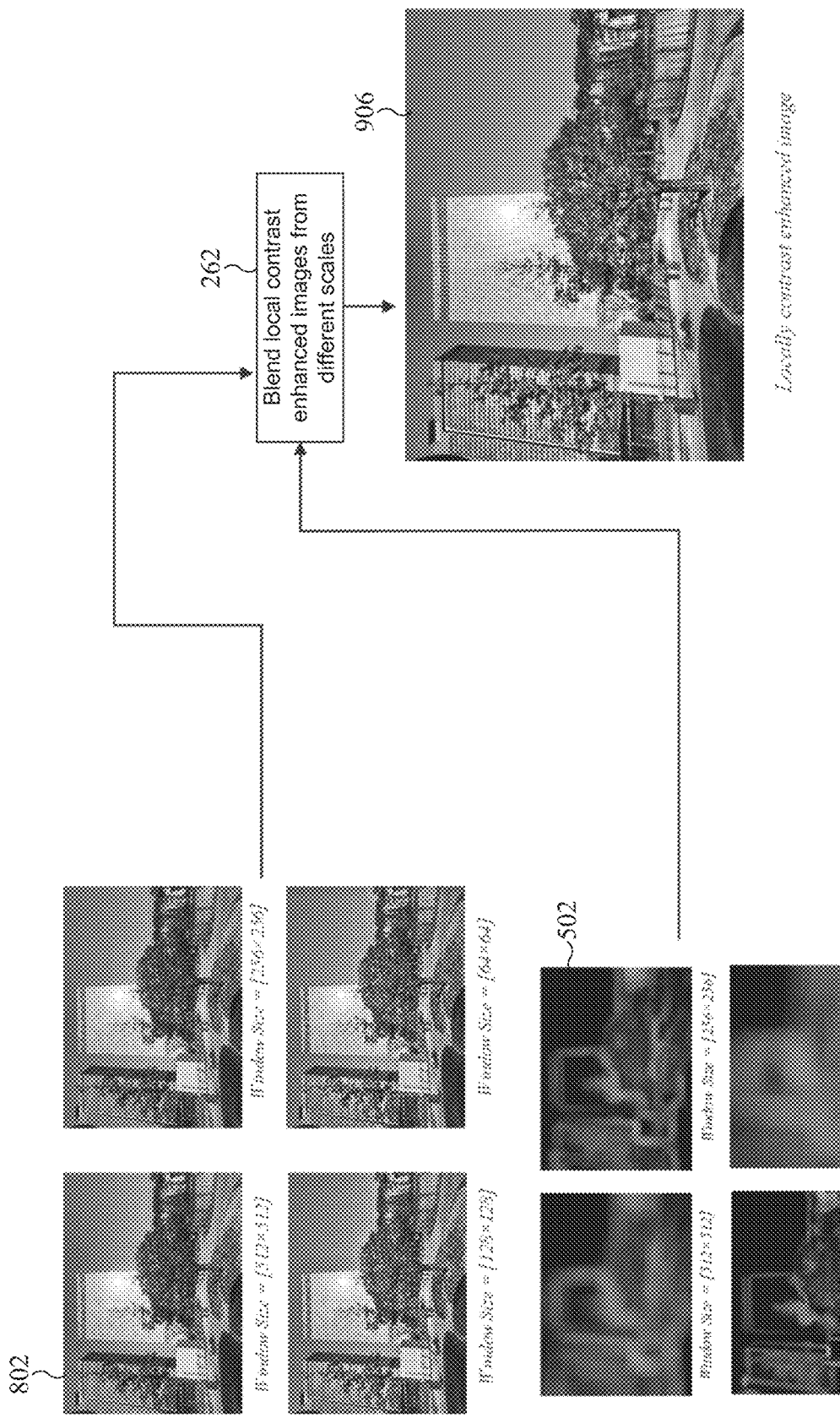
FIG. 9 illustrates an example locally-enhanced contrast blending operation in accordance with this disclosure.

A locally-enhanced contrast blending operation 262 generally operates to blend the locally contrast-enhanced frames 802. FIG. 9 illustrates an example locally-enhanced contrast blending operation 262 in accordance with this disclosure. As shown in FIG. 9, a blending locally-enhanced contrast blending operation 262 can generate a locally contrast-enhanced frame 906 by blending the locally contrast-enhanced frames 802 using the texture maps 502. A texture map 502 for each scale used to generate a locally contrast-enhanced frame 802 can be applied to determine values for each pixel in the locally contrast-enhanced frame 906.

Figure 10:
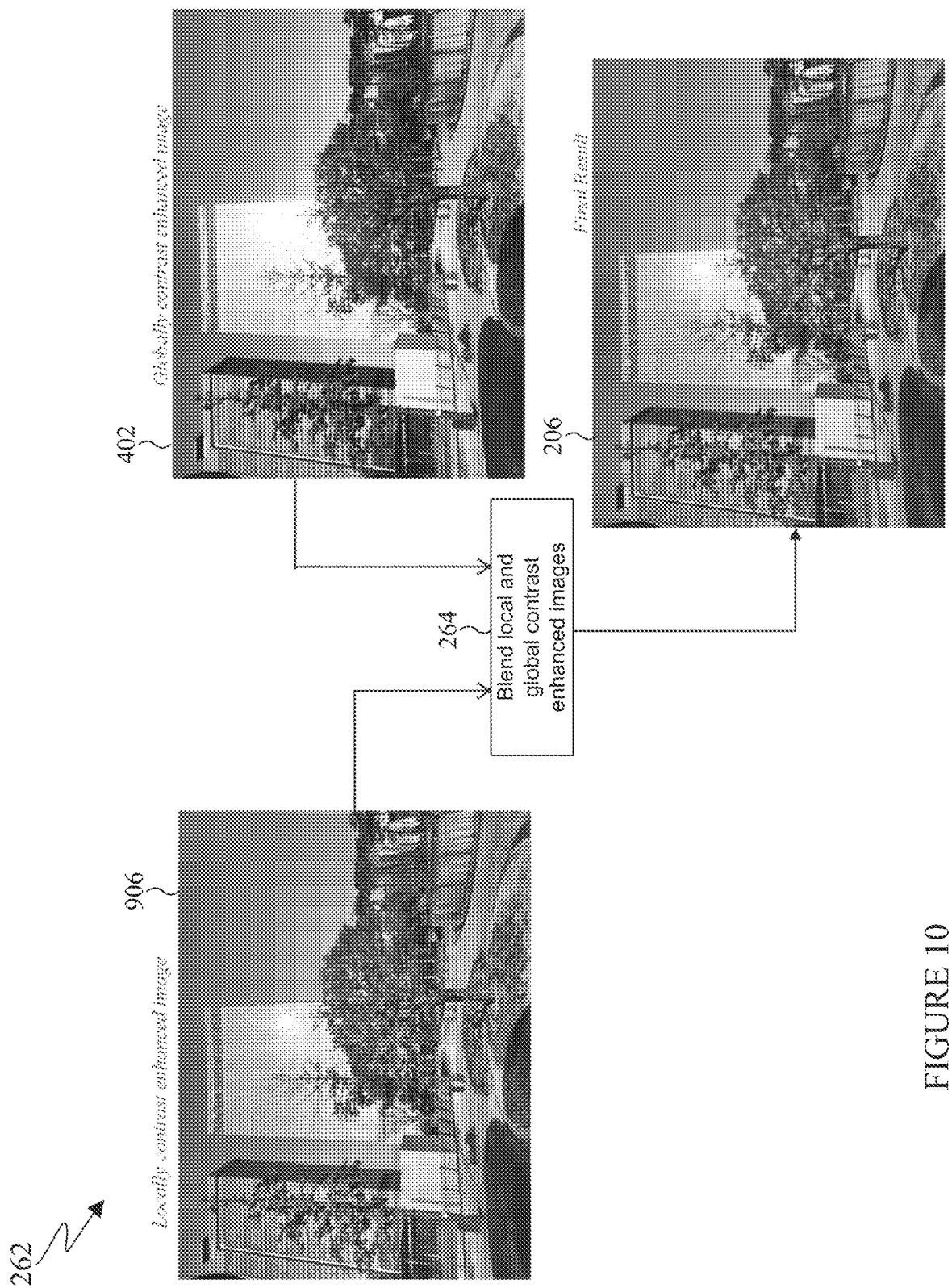
FIG. 10 illustrates an example blending operation in accordance with this disclosure.

A blending operation 264 generally operates to blend the blended locally contrast-enhanced frame 906 and the globally-enhanced frame 402. FIG. 10 illustrates an example blending operation 264 in accordance with this disclosure. As shown in FIG. 10, the blending operation 264 can generate the output image 206 by blending the locally contrast-enhanced frame 906 and the globally-enhanced frame 402. In some embodiments, an input frame 202 can also be used in the general blending enhancement frames operation 904. In particular embodiments, the general blending enhancement frames operation 904 can be performed in the following manner.

$$Y_{final} = \frac{\lambda_g Y_{global} + \lambda_l Y_{local} + \lambda_i Y_{input}}{\lambda_g + \lambda_l + \lambda_i} \quad (6)$$

Here, $Y_{final}$ represents a final contrast-enhanced luma image, $Y_{global}$ represents a global contrast-enhanced luma image, $Y_{local}$ represents a local contrast-enhanced luma image, $Y_{input}$ represents an input image, and $\lambda_g$, $\lambda_l$, and $\lambda_i$ represent weight parameters. The values of the weight parameters do not necessarily need to sum to one due to normalization in the above equation. For example, the weights can be $\lambda_g=0.2$, $\lambda_l=0.8$, and $\lambda_i=0.0$. Other values of the weight parameters can be used.

A boost chroma operation 266 may optionally be used following the blending operation 264 to boost the chroma values in the output image 206. Boosting the chroma values can help to increase color saturation in the output image 206. For example, the chroma values can be increased in areas where colors were reduced due to contrast enhancement.

As shown in FIG. 2A, the contrast-enhanced image from the multi-scale contrast enhancement operation 201 and the tone maps from the tone map generation operation 205 are provided to a global tone mapping application operation 220, which generally operates to apply global tone mapping to the contrast-enhanced image in order to generate the output image 206. Global tone mapping typically involves applying a common tone mapping to an entire image. As such, the global tone mapping is often referred to as a spatially-uniform tone mapping operation. The global tone mapping application operation 220 may use any suitable technique(s) to perform global tone mapping.

Although FIGS. 2A and 2B illustrate one example of an architecture 200 for locally-adaptive multi-scale image enhancement and FIGS. 3 through 10 illustrate related details, various changes may be made to FIGS. 2A through 10. For example, various components or functions in these figures may be combined, further subdivided, replicated, rearranged, or omitted according to particular needs. Also, various additional components or functions may be used in these figures. In addition, the numbers of various components (including scales, tiles, and input frames) can vary as needed or desired.

Figure 11:
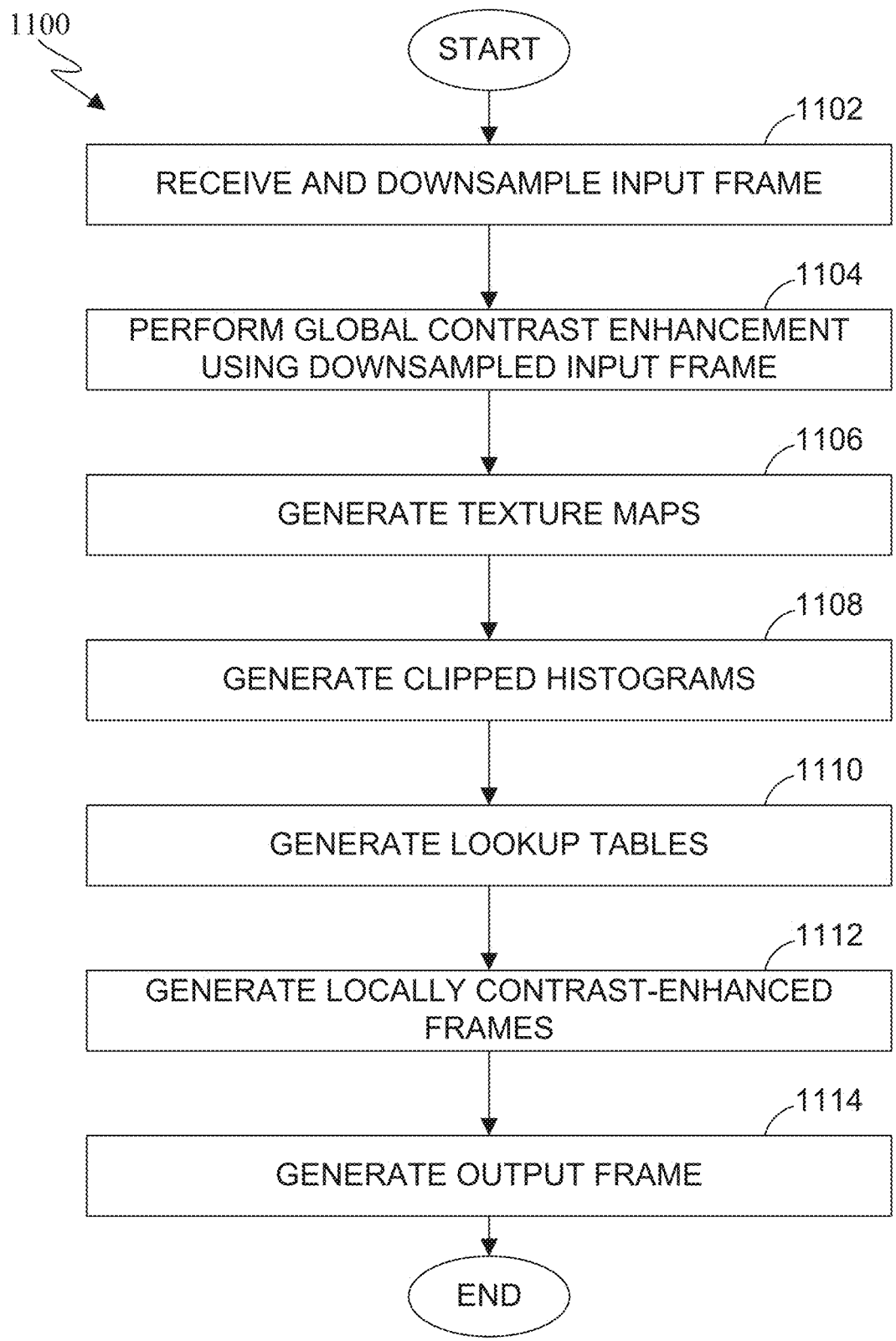
FIG. 11 illustrates an example method for locally-adaptive multi-scale image enhancement according to this disclosure.

FIG. 11 illustrates an example method 1100 for locally-adaptive multi-scale image enhancement according to this disclosure. For case of explanation, the method 1100 shown in FIG. 11 is described as being performed by the electronic device 101 in the network configuration 100 of FIG. 1, where the electronic device 101 can implement the architecture 200 shown in FIGS. 2A and 2B. However, the method 1100 shown in FIG. 11 could be performed by any other suitable device(s) and in any other suitable system(s), such as when the method 1100 is performed using the server 106.

As shown in FIG. 11, the electronic device 101 can receive and downsample an input frame in operation 1102. For example, an input frame can be downsampled from 50 megapixels to 3 megapixels. The downsampled input frame can also represent a grayscale version of the input frame since color information may not be needed during contrast enhancement. In some embodiments, the input frame can be converted to an 8-bit frame or other reduced bit depth frame during downsampling. The electronic device 101 can perform global contrast enhancement using the downsample input frame in operation 1104. For example, a globally contrast-enhanced frame can be generated by applying global contrast enhancement to the input frame based on the downsampled input frame. As a particular example, a global histogram can be generated using the downsampled input frame, which can be used to apply global contrast enhancement to the input frame.

The electronic device 101 can generate texture maps in operation 1106. The texture maps can be generated at different scale resolutions based on the downsampled input frame and the texture maps can be used to identify detail in the image frame. The texture maps may tend towards a value of one when variance values are significantly greater than a constant parameter (such as a value of $64^2$) and tend towards a value of zero when the variance values are significantly less than the constant parameter. In some embodiments, the generation of the texture maps can involve using windows to determine pixel details in a frame, where first and second windows can be adjacent windows that overlap and where the texture map generation include determining a first local mean and a first local variance of the first window and a second local mean and a second local variance of the second window as partially shifted from the first window. In particular embodiments, an overlap area of the first window and the second window can be identified based on pixels that are included in both windows, a first unique area can be identified as an area of the first window that is not included in the second window, and a second unique area can be identified as an area of the second window that is not included in the first window. When the first mean and the first variance of the first window are determined, the texture values of the pixels in the overlap area do not need to be computed again for the second window or subsequent windows.

The electronic device 101 can generate clipped histograms in operation 1108. The clipped histograms can be generated at the different scale resolutions based on the downsampled input frame, and histograms can be computed at different window sizes for each of the different scale resolutions. A local contrast strength parameter for limiting contrast enhancement via a clip limit may be given for each histogram in each scale. In some case, the clip limit can be identified based on a texture value in neighboring tiles for each tile in a frame. As particular examples, the clip limit can be determined based on a lowest texture value for a neighboring tile, an average texture value of the neighboring tiles, or any other suitable texture value. The neighboring tiles can represent tiles that are directly adjacent to the tile where the clip limit is being computed. The histograms can be clipped using the clip limit as an upper threshold. A lower limit of the clip limit can limit contrast in order to reduce overall contrast enhancing portions of the frame.

The electronic device 101 can generate LUTs in operation 1110. The LUTs can be generated at different scale resolutions based on texture maps, the clipped histograms, and optionally one or more tuning parameters. A LUT can be generated based on a window size, and the LUT in some cases can be a running integral or cumulative sum of the values of a specified histogram. The electronic device 101 can generate locally contrast-enhanced frames in operation 1112. The locally contrast-enhanced frames can be generated at the different scale resolutions by applying the LUTs at the different scale resolutions to the input frame. The number of locally contrast-enhanced frames can correspond to the number of scale resolutions used. The electronic device 101 can generate an output frame in operation 1114. The output frame can be generated by blending the locally contrast-enhanced frames at the different scale resolutions to generate a single locally contrast-enhanced frame, such as by linearly blending the locally contrast-enhanced frames using the texture maps. The single locally contrast-enhanced frame can be blended with the globally contrast-enhanced frame to generate the output image.

Although FIG. 11 illustrates one example of a method 1100 for locally-adaptive multi-scale image enhancement, various changes may be made to FIG. 11. For example, while shown as a series of steps, various steps in FIG. 11 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. An electronic device comprising:
at least one processing device configured to:
downsample an input frame;
perform global contrast enhancement of the input frame based on the downsampled input frame to generate a globally contrast-enhanced frame;
generate texture maps at different scale resolutions based on the downsampled input frame;
generate clipped histograms at the different scale resolutions based on the downsampled input frame;
generate lookup tables (LUTs) at the different scale resolutions based on the texture maps and the clipped histograms;
apply the LUTs at the different scale resolutions to the input frame in order to generate locally contrast-enhanced frames; and
blend the locally contrast-enhanced frames and the globally contrast-enhanced frame to generate an output frame.

2. The electronic device of claim 1, wherein, to perform the global contrast enhancement, the at least one processing device is configured to:
generate a global histogram using the downsampled input frame; and
perform global contrast enhancement of the input frame using the global histogram.

3. The electronic device of claim 1, wherein, to generate the clipped histograms, the at least one processing device is configured to:
generate histograms at different window sizes for each of the different scale resolutions;
determine, for each histogram, a clip limit for limiting contrast enhancement; and
clip each of the histograms using the clip limit corresponding to the histogram.

4. The electronic device of claim 3, wherein, to determine the clip limit, the at least one processing device is configured to:
identify, for each tile in the input frame, texture values in neighboring tiles; and
determine the clip limit based on a lowest of the texture values in the neighboring tiles.

5. The electronic device of claim 3, wherein, to determine the clip limit, the at least one processing device is configured to:
identify, for each tile in the input frame, texture values in neighboring tiles; and
determine the clip limit based on an average of the texture values in the neighboring tiles.

6. The electronic device of claim 1, wherein, to generate the texture maps, the at least one processing device is configured to:
determine a first local mean and a first local variance of a first window in the input frame;
determine a second local mean and a second local variance of a second window in the input frame that is partially shifted from the first window; and
generate the texture maps based on the first local variance and the second local variance.

7. The electronic device of claim 6, wherein, to determine the second local mean and the second local variance of the second window, the at least one processing device is configured to:
identify an overlap area of the first window and the second window;
identify a first unique area of the first window that includes an area of the downsampled input frame not included in the second window;
identify a second unique area of the second window that includes an area of the downsampled input frame not included in the first window; and
determine the second local mean and the second local variance without using pixel values in the first unique area.

8. A non-transitory machine readable medium containing instructions that when executed cause at least one processor to:
downsample an input frame;
perform global contrast enhancement of the input frame based on the downsampled input frame to generate a globally contrast-enhanced frame;
generate texture maps at different scale resolutions based on the downsampled input frame;

generate clipped histograms at the different scale resolutions based on the downsampled input frame;
generate LUTs at the different scale resolutions based on the texture maps and the clipped histograms;
apply the LUTs at the different scale resolutions to the input frame in order to generate locally contrast-enhanced frames; and
blend the locally contrast-enhanced frames and the globally contrast-enhanced frame to generate an output frame.

9. The non-transitory machine readable medium of claim 8, wherein the instructions that when executed cause the at least one processor to generate the clipped histograms comprise instructions that when executed cause the at least one processor to:
generate histograms at different window sizes for each of the different scale resolutions;
determine, for each histogram, a clip limit for limiting contrast enhancement; and
clip each of the histograms using the clip limit corresponding to the histogram.

10. The non-transitory machine readable medium of claim 9, wherein the instructions that when executed cause the at least one processor to determine the clip limit comprise instructions that when executed cause the at least one processor to:
identify, for each tile in the input frame, texture values in neighboring tiles; and
determine the clip limit based on a lowest of the texture values in the neighboring tiles.

11. The non-transitory machine readable medium of claim 9, wherein the instructions that when executed cause the at least one processor to determine the clip limit comprise instructions that when executed cause the at least one processor to:
identify, for each tile in the input frame, texture values in neighboring tiles; and
determine the clip limit based on an average of the texture values in the neighboring tiles.

12. The non-transitory machine readable medium of claim 8, wherein the instructions that when executed cause the at least one processor to generate the texture maps comprise instructions that when executed cause the at least one processor to:
determine a first local mean and a first local variance of a first window in the input frame;
determine a second local mean and a second local variance of a second window in the input frame that is partially shifted from the first window; and
generate the texture maps based on the first local variance and the second local variance.

13. The non-transitory machine readable medium of claim 12, wherein the instructions that when executed cause the at least one processor to determine the second local mean and the second local variance of the second window comprise instructions that when executed cause the at least one processor to:
identify an overlap area of the first window and the second window;
identify a first unique area of the first window that includes an area of the downsampled input frame not included in the second window;
identify a second unique area of the second window that includes an area of the downsampled input frame not included in the first window; and determine the second local mean and the second local variance without using pixel values in the first unique area.

14. A method comprising:
downsampling an input frame;
performing global contrast enhancement of the input frame based on the downsampled input frame to generate a globally contrast-enhanced frame;
generating texture maps at different scale resolutions based on the downsampled input frame;
generating clipped histograms at the different scale resolutions based on the downsampled input frame;
generating lookup tables (LUTs) at the different scale resolutions based on the texture maps and the clipped histograms;
applying the LUTs at the different scale resolutions to the input frame in order to generate locally contrast-enhanced frames; and
blending the locally contrast-enhanced frames and the globally contrast-enhanced frame to generate an output frame.

15. The method of claim 14, wherein performing the global contrast enhancement comprises:
generating a global histogram using the downsampled input frame; and
performing global contrast enhancement of the input frame using the global histogram.

16. The method of claim 14, wherein generating the clipped histograms comprises:
generating histograms at different window sizes for each of the different scale resolutions;
determining, for each histogram, a clip limit for limiting contrast enhancement; and
clipping each of the histograms using the clip limit corresponding to the histogram.

17. The method of claim 16, wherein determining the clip limit comprises:
identifying, for each tile in the input frame, texture values in neighboring tiles; and
determining the clip limit based on a lowest of the texture values in the neighboring tiles.

18. The method of claim 16, wherein determining the clip limit comprises:
identifying, for each tile in the input frame, texture values in neighboring tiles; and
determining the clip limit based on an average of the texture values in the neighboring tiles.

19. The method of claim 14, wherein generating the texture maps comprises:
determining a first local mean and a first local variance of a first window in the input frame;
determining a second local mean and a second local variance of a second window in the input frame that is partially shifted from the first window; and
generating the texture maps based on the first local variance and the second local variance.

20. The method of claim 19, wherein determining the second local mean and the second local variance of the second window comprises:
identifying an overlap area of the first window and the second window;
identifying a first unique area of the first window that includes an area of the downsampled input frame not included in the second window;
identifying a second unique area of the second window that includes an area of the downsampled input frame not included in the first window; and determining the second local mean and the second local variance without using pixel values in the first unique area.

* * * * *